United States Patent
Deville

(10) Patent No.: US 7,239,972 B2
(45) Date of Patent: Jul. 3, 2007

(54) METHOD FOR SETTING, IN A MOTOR VEHICLE ELECTRICAL POWER STEERING SYSTEM, THE POWER STEERING TORQUE SET POINT

(75) Inventor: Jean-Luc Deville, Saint Laurent de Mure (FR)

(73) Assignee: Koyo Steering Europe, Irigny (FR)

( * ) Notice: Subject to any disclaimer, the term of this patent is extended or adjusted under 35 U.S.C. 154(b) by 0 days.

(21) Appl. No.: 10/536,751

(22) PCT Filed: Dec. 2, 2003

(86) PCT No.: PCT/FR03/03565

§ 371 (c)(1),
(2), (4) Date: May 27, 2005

(87) PCT Pub. No.: WO2004/052711

PCT Pub. Date: Jun. 24, 2004

(65) Prior Publication Data

US 2005/0284688 A1 Dec. 29, 2005

(30) Foreign Application Priority Data

Dec. 6, 2002 (FR) .................................. 02 15475

(51) Int. Cl.
*G06F 19/00* (2006.01)
(52) U.S. Cl. ............... 702/94; 702/33; 702/41; 702/42; 702/43; 702/44; 702/96; 702/142
(58) Field of Classification Search .................. 702/94, 702/33, 41–44, 96, 142, 145; 701/41, 42
See application file for complete search history.

(56) References Cited

U.S. PATENT DOCUMENTS

| 4,753,308 | A | * | 6/1988 | Noto et al. .................. 180/446 |
| 6,138,788 | A | | 10/2000 | Bohner et al. |
| 6,876,911 | B2 | * | 4/2005 | Chen et al. .................... 701/41 |
| 2004/0084241 | A1 | | 5/2004 | Niessen et al. |

FOREIGN PATENT DOCUMENTS

DE  100 34 135  10/2001

* cited by examiner

*Primary Examiner*—Marc S. Hoff
*Assistant Examiner*—Phuong Huynh
(74) *Attorney, Agent, or Firm*—Ladas & Parry LLP

(57) ABSTRACT

A motor vehicle power steering system, including a steering column and a power steering motor. The column has an upper part bearing a steering wheel and a lower part acting on a mechanical steering device. A setpoint at which the motor should apply a power assist to the steering column is set on the basis of information concerning the torque exerted on the steering wheel. The information is obtained by measuring angles at the steering wheel and at the lower part of the column, and the setpoint is established by comparing the two angle measurements, taking into account the rigidity of the steering column between the two angle-measuring points.

11 Claims, 2 Drawing Sheets

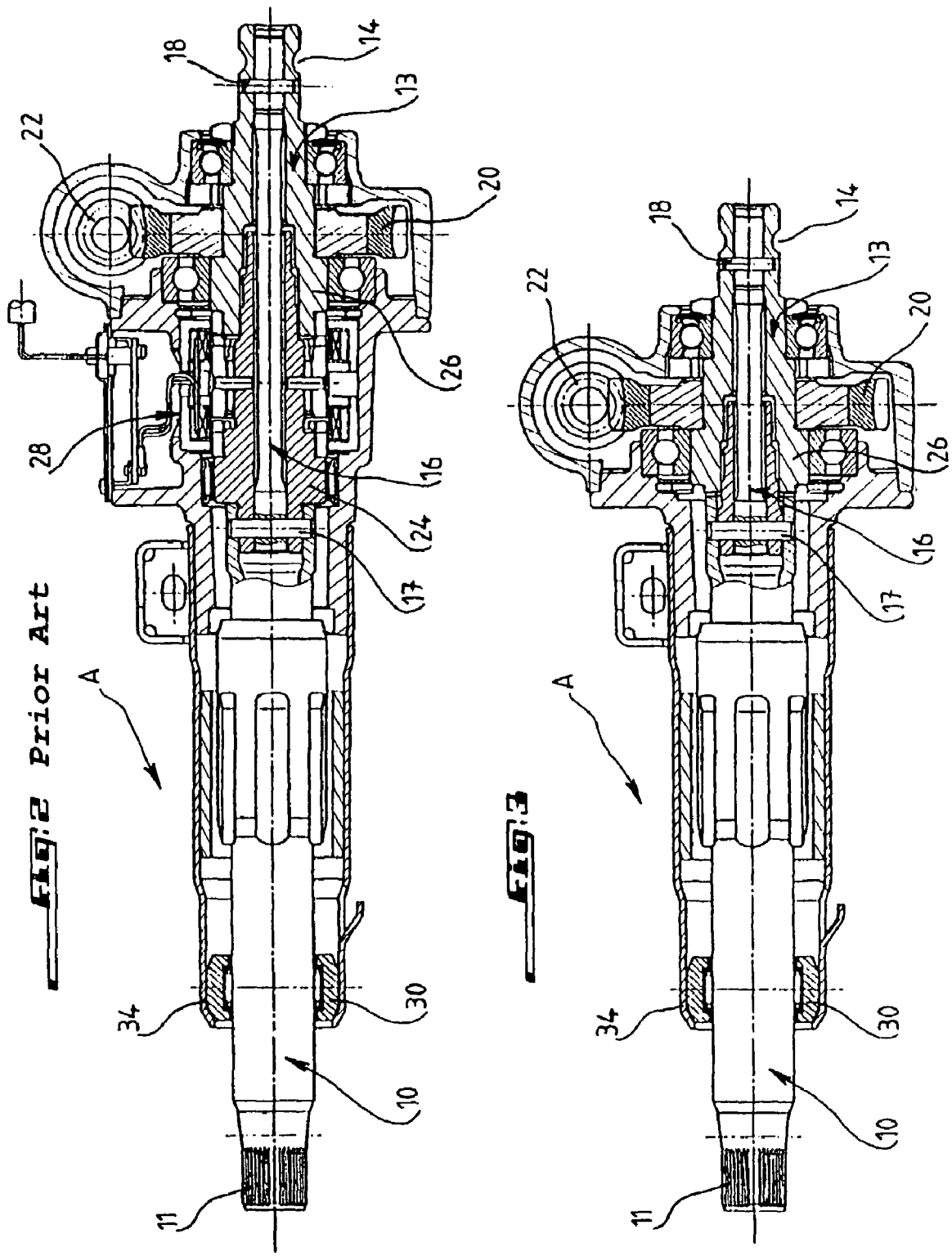

METHOD FOR SETTING, IN A MOTOR VEHICLE ELECTRICAL POWER STEERING SYSTEM, THE POWER STEERING TORQUE SET POINT

FIELD OF THE INVENTION

The invention relates to a method for setting, in a motor vehicle electrical power steering system of the type which includes a vehicle steering column and a steering assistance electric motor, the set point of the torque that must be applied to the steering column by the assistance motor during power steering with a lower part suitable for acting on a mechanical steering device, a method according to which the assistance set point is established from information concerning the torque exerted by the driver on the steering wheel.

The invention also relates to an electrical power steering system for implementation of this method.

BACKGROUND OF THE INVENTION

In known electrical power steering systems, the steering wheel torque exerted by the driver when the vehicle is in motion is measured by a dedicated torque sensor. The information thus obtained is subsequently processed by an on-board computer in order to determine the set point of the torque that must be applied to the steering column by the assistance motor, for example, in the case of turning.

These electrical power steering systems have the major disadvantage that the torque sensors have a complex and bulky structure and are difficult to use and calibrate.

SUMMARY OF THE INVENTION

The objective of the invention is to propose a method for setting the set point which is to be applied to the steering column of an automobile in a power steering system and a corresponding steering system which make it possible to remedy the disadvantages of the prior art just mentioned.

In order to attain this objective, in a method according to the invention information concerning the steering wheel torque is obtained by measurement of the angles of the steering column, at the site of the steering wheel and at the site of the assistance motor, and the set point of the torque to be applied by the assistance motor is established by comparison of the two angle measurements while taking into account the rigidity of the steering column between the two angle measurement sites.

According to the invention, the angle, speed and acceleration of the steering wheel and the position, speed, and acceleration of the assistance motor acting on the lower part of the steering column are measured.

According to another characteristic of the invention, an operation for verifying the validity of the acquired measurement values is carried out.

According to yet another characteristic of the invention, the load on the steering wheel is computed by comparison of the positions of the two angle sensors; the variation cif the steering wheel load is computed with respect to the speeds of rotation between the two sensors; PID filtering is done on the two measurements made, and the resulting information is used as torque information for computation of the set point of the assistance torque that must be applied to the steering column by the assistance motor.

According to yet another characteristic of the invention, a test is done as to whether recalibration of the assistance function is possible and necessary, and in the case of a negative response, the program for setting the set point of the assistance torque returns to the operation of measuring the magnitudes.

According to yet another characteristic of the invention, in the case of a positive response, a computation of a new compensation with regard to the midpoint position of the steering is done, and, if necessary, a recomputation of the value of the play in the reducing gear associated with the motor is done, and the program, after storing this information, is brought to the operation of measuring the magnitudes.

According to yet another characteristic of the invention, the recalibration test is done based on at least the information of the passage of the steering wheel through the zero position, the speed of rotation of the steering wheel and of the motor which must be less than a predetermined threshold, on the determination that there is no degraded mode in progress, and on the possible validation of the data obtained during the operation of measuring the magnitudes.

According to yet another characteristic of the invention, an intermediate part in the form of a torque rod is provided between the upper and lower parts of the steering column, and the rigidity of this rod is taken into account in setting the aforementioned torque set point.

The electrical power steering system for implementation of this method includes an angle sensor for the steering wheel and an angle sensor at the site of the lower part of the steering column as well as a device for computation from the measured angles of the set point of the assistance torque to be applied by the motor to the steering column.

According to one characteristic of the invention, the invention includes an angle sensor arranged at the site of the upper part of the steering column carrying the steering wheel.

According to another characteristic of the invention, the angle sensor associated with the lower part of the steering column is integrated into the assistance motor.

According to yet another characteristic of the invention, the steering column has a torque rod between the two sites of the column where the angle measurements take place.

According to yet another characteristic of the invention, the torque rod is an integral part of the steering column.

According to yet another characteristic of the invention, the rod is a controlled torsion part of the steering column.

According to yet another characteristic of the invention, the structure of the steering column itself is a torque rod.

BRIEF DESCRIPTION OF THE DRAWINGS

The invention will be better understood and other objectives, characteristics, details and advantages of it will appear more clearly in the following explanatory description with reference to the appended diagrammatic drawings, given only as examples illustrating an embodiment of the invention, and in which:

FIG. 2 is a view in axial section of the part of the steering column, indicated as A in FIG. 1, of an electrical power steering system according to the prior art, and FIG. 3 is a view of part A of an electrical power steering system according to the invention.

DETAILED DESCRIPTION OF THE INVENTION

Figure 1:
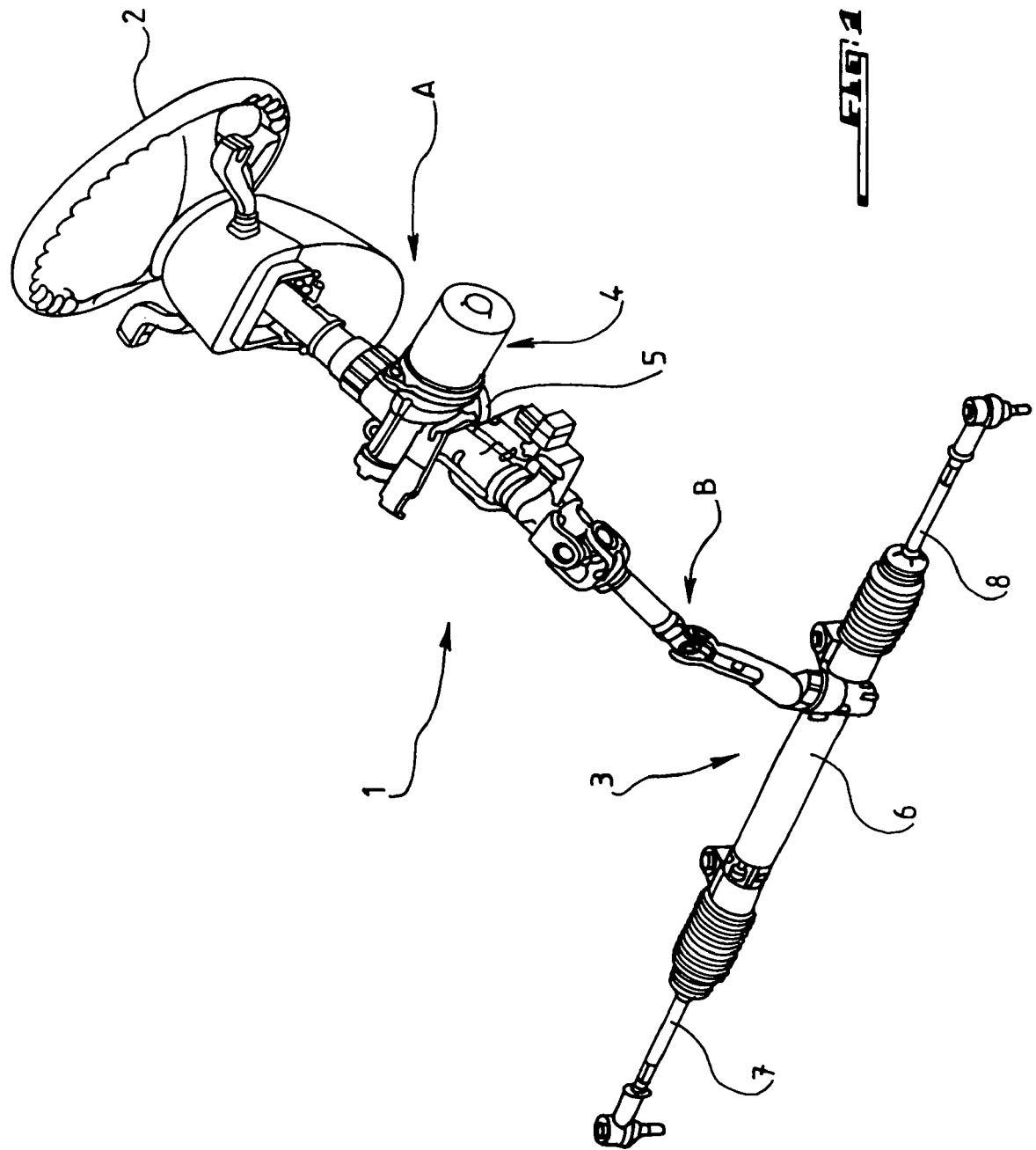
FIG. 1 is an oblique view of a motor vehicle electrical power steering system.

As seen in FIG. 1, a motor vehicle electrical power steering (DAE) system essentially includes steering column 1 bearing, at its upper end, steering wheel 2 which can be operated by the driver of the vehicle, mechanical steering device 3 acted on by the lower end of steering column 1, and electric assistance motor 4 with which reducing gear 5 is associated. In a manner known in itself, the mechanical steering device has steering case 5 inside of which a rack, not represented, is axially mobile, and coupling rods 6, 7 on the right side and on the left side, each coupled at one end to the rack and at the other end to the steering device of a front wheel of the device. The rack is moved axially by a pinion gear, not represented, which is connected rotationally with the lower end of steering column 1. Given that steering wheel 2 is mounted so as to be rotationally connected on the upper end of steering column 1, rotation of this steering wheel, effects the axial movement of coupling rods 7 and 8 by means of steering column 1.

FIG. 2 illustrates the portion indicated as A in FIG. 1 of steering column 1 of an electrical power steering (DAE) system of the prior art. It is observed that portion A of the steering column includes upper part 10 whose upper end 11 bears steering wheel 2, lower column part 13 whose lower end 14 can be connected to articulated lower portion B of steering column 1 which acts on mechanical steering device 3, and intermediate portion 16 in the form of a torque rod which is rotationally connected at the upper part, at 17, to upper column part 10, and at the lower part, at 18, to lower column part 13.

FIG. 2 also shows, rotationally connected with lower column part 13, helical pinion gear 20 which cooperates with rod 22 provided with peripheral helical toothing complementary to the toothing of pinion gear 20. The two toothings mesh with one another. Shaft 22 is put in rotation by assistance motor 4.

It emerges from these figures that lower part 13 of the steering column is produced in the form of a tubular piece which coaxially surrounds a part of torque rod 16, and that the upper end of the latter is connected at 17 with another tubular piece 24 which engages by its lower part, coaxially, in upper portion 26 of piece 13 forming the lower part of the column, whose upper portion is consequently hollow in order to receive piece 24.

The power steering system according to the prior art, represented in FIG. 2, is based on the use of a torque sensor, indicated as 28, for setting the set point of the torque that assistance motor 4 must apply to steering column 1, that is to say to lower column part 13 by means of shaft 22 and pinion gear 20. It is observed that this torque sensor, as indicated above, has a complex and very bulky structure, with the consequence that the structure of the steering column is also bulky both axially and radially.

The invention aims to remedy these disadvantages, which lie in the complex structure and also in the fact that this structure makes the system difficult to use and to calibrate.

FIG. 3 shows portion A of a power steering DAE system according to the invention. Because torque sensor 28 is eliminated, the bulkiness of this system is reduced both axially and radially with respect to the known system of FIG. 2. In effect, it has proven possible to do without this complex torque sensor for measuring the steering wheel loads, and an estimation, which could be precise, of the steering wheel torque exerted by the driver is sufficient for effective steering assistance.

According to the invention, a sensor of the angular position of the steering wheel, indicated as 30, and which is associated with upper part 10 of the steering column and is mounted on fixed casing 34 is provided for this purpose. The invention uses a second angle sensor, that is to say a sensor of the angular position of lower column part 13. This angle sensor is situated at the level of assistance motor 4, and could be a sensor incorporated in this motor.

Given that the link between the two metallic components formed by the two parts 10 and 13 of steering column 1 is established by torque rod 16 with known characteristics, it is possible to determine a first approximation of the steering wheel torque by the following formula:

(steering wheel angle−motor angle)×torque rod rigidity=steering wheel torque, with it being possible, of course, for the motor angle to take into account the reducing gear.

In the formula above, the rigidity of the torque rod is taken into account by considering that it is this rod that determines the torque of the steering column between the two angle sensors. Of course, it would also be possible to envisage the torque rod as not existing by itself but as being an integral part of the column, either in the form of a part with controlled torsion, or in the form of the structure itself of the column or the whole part between the two angle sensors.

It is possible to provide a correction for this computation enabling one to make the result more precise while taking into account the play in the reducing gear, which could be a few minutes. For this, it would be possible to take into account the sign of the measurement which could be positive or negative. The precision could be improved by a precise calibration of the angle sensors, from the position of the midpoint of the steering. This calibration could take place regularly when the vehicle is stopped or while moving.

More precisely, a program for setting the set point of the torque that must be applied to the steering column by assistance motor 4 begins with the measurement, using the angle sensors, of the position, speed and acceleration of the steering wheel and of the position, speed and acceleration of assistance motor 4.

After verifying the validity of the acquired magnitudes, a first computation is made using a computer that allows one to obtain the load exerted on the steering wheel by comparison of the angular positions between the two sensors, advantageously with integration of the play of the reducing gear during a change of the direction of rotation. Then, by means of a second computation, the variation of the steering wheel load is established by comparing the speeds of rotation between the two sensors. Then, PID (proportional, integral, differential) filtering is applied to the two measurements made, taking into account the preceding information. The resulting information concerning the torque is then used to compute the assistance that must be provided by motor 4.

The invention then provides for the possibility of doing a test as to whether recalibration is possible and necessary. This recalibration test could be done based on the information of passage of the steering wheel through the zero position, on the speed of rotation of the steering wheel and of the motor, which must be less than a predetermined threshold, on the question as to whether there is a degraded mode in progress, and on the possible validation of the data obtained during the operation of measuring the magnitudes.

If the recalibration test gives a negative response, the method returns to the operation of measuring the magnitudes.

If the test gives a positive response, one proceeds with a new computation of the position of the midpoint of the steering, and a recomputation of the value of the play in the motor reducing gear is done if this proves to be necessary. After storage of this information, if necessary in an EEPROM memory, the method returns to the operation of measuring the magnitudes.

Of course, various modifications can be made on the DAE system of the invention, with regard to the structure as well as the level of utilization. Thus, in the known power steering systems equipped with a torque sensor and provided with an already existing or added steering wheel angle sensor 30, it would be possible to use the method according to the invention without involvement of the torque sensor, for example, in case of a defect in the measurement information of this sensor, as a back-up and replacement solution so that the vehicle can continue its travel.

The invention claimed is:

1. A method for setting, in a motor vehicle electrical power steering system which includes a vehicle steering column and a steering assistance motor, a set point of an assistance torque that must be applied to the steering column by the motor, the steering column having an upper part bearing a steering wheel and a lower part which acts on a mechanical steering device, the method including:
    obtaining information concerning torque exerted on the steering wheel by measuring a first angle with a first sensor at the steering wheel and a second angle with a second sensor at the lower column part,
    comparing the first and second angles measured, taking into account rigidity of the steering column between locations at which the first and second angles are measured;
    computing the load on the steering wheel by comparison of positions of the first and second sensors;
    computing variation of the load on the steering wheel with respect to speeds of rotation of the first and second sensors, PID filtering of the first and second angles measured to obtain torque information for computation of the set point of the assistance torque to be applied to the steering column by the assistance motor; and
    applying said set point to the steering column by the assistance motor.

2. The method according to claim 1, including measuring the angle, speed, and acceleration of the steering wheel and the position, speed, and acceleration of the assistance motor acting on the lower part of the steering column.

3. The method according to claim 2, including verifying validity of the first and second angles.

4. The method according to claim 1, including testing whether recalibration of the assistance function is possible and necessary, if not, returning to measuring of magnitudes.

5. The method according to claim 4, wherein, if recalibration is possible and necessary, computing a new compensation with regard to a midpoint position of the steering wheel, and, if necessary, recomputing play in a reducing gear associated with the motor, and returning to measuring of the magnitudes.

6. The method according to claim 4, including testing for recalibration based on at least passage of the steering wheel through a zero position, the speeds of the steering wheel and of the motor, which must be less than a predetermined threshold, upon a determination that no degraded mode is in progress, on validation of data obtained during the measuring.

7. The method according to claim 1, wherein, between the upper part and the lower part of the steering column, a torque rod is provided, and rigidity of the torque rod is taken into account in setting the set point.

8. The method according to claim 1, wherein the second sensor is integrated into the assistance motor.

9. The method according to claim 1, wherein the torque rod is an integral part of steering column.

10. The method according to claim 1, wherein the torque rod has controlled torsion.

11. The method according to claim 10, wherein the steering column is a torque rod.

* * * * *